(12) United States Patent
Katz et al.

(10) Patent No.: US 8,795,415 B2
(45) Date of Patent: Aug. 5, 2014

(54) PROCESS FOR RECOVERY OF CARBON DIOXIDE FROM A FLUID STREAM, IN PARTICULAR FROM SYNGAS

(75) Inventors: Torsten Katz, Neustadt (DE); Georg Sieder, Bad Dürkheim (DE); Koji Tanaka, Yokohama (JP)

(73) Assignees: BASF SE, Ludwigshafen (DE); JGC Corporation, Tokyo (JP)

( * ) Notice: Subject to any disclaimer, the term of this patent is extended or adjusted under 35 U.S.C. 154(b) by 268 days.

(21) Appl. No.: 13/322,125

(22) PCT Filed: May 25, 2010

(86) PCT No.: PCT/EP2010/057107
§ 371 (c)(1),
(2), (4) Date: Nov. 22, 2011

(87) PCT Pub. No.: WO2010/136425
PCT Pub. Date: Dec. 2, 2010

(65) Prior Publication Data
US 2012/0067059 A1    Mar. 22, 2012

(30) Foreign Application Priority Data
May 26, 2009 (EP) .................... 09161167

(51) Int. Cl.
*B01D 53/14* (2006.01)
(52) U.S. Cl.
USPC .............. 95/173; 95/174; 95/176; 95/183; 95/193; 95/209; 95/228; 95/236; 96/234; 96/242; 423/228
(58) Field of Classification Search
None
See application file for complete search history.

(56) References Cited

U.S. PATENT DOCUMENTS

| 3,383,838 A | * | 5/1968 | Carson | 95/174 |
| 3,420,885 A | * | 1/1969 | Schroeder | 95/250 |

(Continued)

FOREIGN PATENT DOCUMENTS

| EP | 0 359 991 A1 | 3/1990 |
| EP | 768 365 A1 | 4/1997 |

(Continued)

*Primary Examiner* — Duane Smith
*Assistant Examiner* — Pankti Patel
(74) *Attorney, Agent, or Firm* — Drinker Biddle & Reath LLP (57) ABSTRACT

A process for removing carbon dioxide from a fluid comprises the steps of: (a) treating the fluid by bringing it into countercurrent contact with a liquid absorbent in a first absorption zone and thereafter in a second absorption zone to absorb at least part of the carbon dioxide contained in the fluid into the absorbent; (b) depressurizing the loaded absorbent to release a first stream of carbon dioxide and yield a partially regenerated absorbent; (c) recycling a first stream of the partially regenerated absorbent into the first absorption zone; (d) heating a second stream of the partially regenerated absorbent to release a second stream of carbon dioxide and yield a regenerated absorbent; (e) recycling the regenerated absorbent into the second absorption zone; (f) condensing water vapor entrained in the second stream of carbon dioxide by cooling the second stream of carbon dioxide and transferring at least part of the heat recovered to the partially regenerated absorbent by indirect heat exchange. The invention provides a two-stage carbon dioxide recovery process wherein the overall energy required for carbon dioxide recovery is reduced and/or wherein at least part of the carbon dioxide is recovered at a pressure higher than atmospheric pressure so as to reduce the energy required for compression of the carbon dioxide, e.g., for sequestration. Also disclosed is a plant for removing carbon dioxide from a fluid.

16 Claims, 2 Drawing Sheets

(56) References Cited

U.S. PATENT DOCUMENTS

| | | | |
|---|---|---|---|
| 3,594,985 A * | 7/1971 | Ameen et al. | 95/163 |
| 4,001,347 A | 1/1977 | Grosick et al. | |
| 4,035,166 A * | 7/1977 | Van Hecke | 95/163 |
| 4,336,233 A | 6/1982 | Appl et al. | |
| 4,833,171 A * | 5/1989 | Sweeney | 518/703 |
| 4,999,031 A | 3/1991 | Gerhardt et al. | |
| 5,736,115 A * | 4/1998 | Iijima et al. | 423/228 |
| 5,736,116 A * | 4/1998 | LeBlanc et al. | 423/359 |
| 6,455,011 B1 * | 9/2002 | Fujimura et al. | 422/139 |
| 6,497,852 B2 | 12/2002 | Chakravarti et al. | |
| 2006/0138384 A1 | 6/2006 | Grossman et al. | |
| 2009/0101868 A1 * | 4/2009 | Zhang et al. | 252/184 |
| 2009/0199713 A1 * | 8/2009 | Asprion et al. | 95/236 |
| 2009/0211447 A1 * | 8/2009 | Lichtfers et al. | 95/201 |
| 2010/0116129 A1 * | 5/2010 | Molaison | 95/44 |
| 2010/0186590 A1 | 7/2010 | Vorberg et al. | |
| 2010/0192770 A1 | 8/2010 | Andarcia et al. | |
| 2010/0236408 A1 | 9/2010 | Asprion et al. | |
| 2010/0288125 A1 | 11/2010 | Vorberg et al. | |
| 2010/0319254 A1 * | 12/2010 | Thacker | 48/128 |
| 2011/0033356 A1 * | 2/2011 | Mazumdar et al. | 423/224 |
| 2011/0094381 A1 | 4/2011 | Lichtfers et al. | |
| 2011/0135549 A1 | 6/2011 | Lichtfers et al. | |
| 2011/0232298 A1 * | 9/2011 | Mahendra et al. | 60/783 |

FOREIGN PATENT DOCUMENTS

| | | |
|---|---|---|
| GB | 928472 A | 6/1963 |
| GB | 2 062 597 | 5/1981 |
| GB | 2 202 522 | 9/1988 |
| WO | WO-2005/009592 A1 | 2/2005 |
| WO | WO-2008/157433 A2 | 12/2008 |
| WO | WO-2009063041 A1 | 5/2009 |

* cited by examiner

PROCESS FOR RECOVERY OF CARBON DIOXIDE FROM A FLUID STREAM, IN PARTICULAR FROM SYNGAS

CROSS-REFERENCE TO RELATED APPLICATIONS

This application is a national stage application (under 35 U.S.C. §371) of PCT/EP2010/057107, filed May 25, 2010, which claims benefit of European application 09161167.3, filed May 26, 2009, the contents of each of which are incorporated herein by reference in their entireties.

FIELD OF THE INVENTION

The present invention relates to a process for the recovery of carbon dioxide and other acid gases from carbon dioxide-containing fluid streams, in particular from syngas, shifted syngas or natural gas.

BACKGROUND

In recent years, global warming due to an increase of atmospheric carbon dioxide has come to be regarded as a problem. Accordingly, there have been attempts to capture the carbon dioxide emissions from coal-fired power plants and industrial smokestacks and sequester it by burying it deep within the earth or the oceans.

Carbonaceous fuels such as coal, oil, natural gas, biomass or petroleum coke are abundant and low in cost and can be used for power generation. Different technologies for power generation are available on the market. Conventional power plant technologies such as Pulverized Coal (PC) or Natural Gas Combined Cycle (NGCC) typically incinerate the fossil fuel by the use of air, oxygen enriched air or oxygen. Triggered by stricter environmental regulations, the search for a power generation process with higher efficiencies and an increasing demand for using petroleum coke and biomass as feedstock, integrated gasification combined cycle (IGCC) systems have been developed which have the potential to achieve improved efficiencies in comparison to conventional power plant. In such a system, syngas (a mixture of hydrogen and carbon monoxide) is produced by partial oxidation of coal or other carbonaceous fuel. This allows cleanup of sulfur and other impurities before combustion. Moreover, if carbon sequestration is desired, the carbon monoxide can be reacted with steam using the water gas shift reaction to form carbon dioxide and hydrogen. Carbon dioxide may then be recovered using conventional technologies known in the art. This allows pre-combustion recovery of carbon dioxide for sequestration.

WO 2008/157433 describes a hybrid IGCC plant which is modified to provide carbon capture and storage, in which the syngas leaving the warm gas cleanup system passes a partial oxidizer, a syngas cooler, a water-gas shift reactor, and an absorption system for separating carbon dioxide from the gaseous fuel, whereby said carbon dioxide is then dried and compressed before being sequestered.

On an industrial scale, aqueous solutions of organic bases, for example alkanolamines, are frequently used as absorbing fluids to remove carbon dioxide from fluid streams. When carbon dioxide dissolves, ionic products form from the base and the carbon dioxide. The absorbing fluid can be regenerated by expansion to a lower pressure, or stripping, with the ionic products back-reacting to liberate the carbon dioxide and/or the carbon dioxide being stripped off by steam. The absorbing fluid can be reused after the regeneration process.

However, in spite of the fact that high-pressure fluid is treated, the carbon dioxide separated from the fluid by a conventionally employed process has a low pressure close to atmospheric pressure. This is disadvantageous in that, for the above-described purpose of permanent storage the carbon dioxide must be pressurized from a low pressure to a pressure of about 150 bar (absolute pressure) which is required for injection. Carbon dioxide at a high pressure is also required for certain industrial uses, e.g., in the production of urea.

In the treatment of a high-pressure gaseous feed stream, a two-stage method is typically employed. A relatively small part of the regenerated absorption liquid (lean solvent) is fed in at the top of the absorber and a relatively large part of only partially regenerated absorption liquid (semi-lean solvent) is fed into the center of the absorber. The majority of the carbon dioxide is removed in the circuit of the partially regenerated absorption liquid (semi-lean loop) and only the polishing is performed using the regenerated absorption liquid. The regeneration step typically comprises expansion or flashing the carbon dioxide-rich absorbing fluid from the high pressure prevailing in the absorber to a lower pressure whereby the loaded absorption liquid is partially regenerated. A smaller part of the absorption liquid is thermally regenerated by direct or indirect heating.

The prior art discloses several processes in which the carbon dioxide is recovered at a pressure higher than atmospheric pressure. An advantage of carrying out the regeneration step at above atmospheric pressure is that low pressure stages of compression may be eliminated.

Thus, EP-A 768 365 teaches a process for removal of highly concentrated carbon dioxide from high-pressure natural gas which comprises an absorption step of bringing natural gas having a pressure of 30 kg/cm$^2$ (30 bar absolute pressure) or greater into gas-liquid contact with an absorbing fluid; and a regeneration step of heating the carbon dioxide-rich absorbing fluid without depressurizing it, whereby high-pressure carbon dioxide is liberated.

U.S. Pat. No. 6,497,852 describes a carbon dioxide recovery process by preferentially absorbing carbon dioxide from a feed stream into a liquid absorbent fluid, pressurizing the resulting stream to a pressure sufficient to enable the stream to reach the top of a stripper at a pressure of 35 psia (2.4 bar absolute pressure) or greater, and stripping carbon dioxide from the stream in the stripper at a pressure of 35 psia (2.4 bar absolute pressure) or greater.

WO 2005/009592 relates to an acid gas regeneration process which is conducted under a pressure that exceeds 50 psia (3.5 bar absolute pressure) and does not exceed 300 psia (20 bar absolute pressure). The separated gas stream emerging from the regenerator is compressed and injected into a sub-surface reservoir.

These processes wherein carbon dioxide is recovered at a pressure higher than atmospheric pressure, however, involve a significantly higher reboiler duty than the above mentioned two-stage method.

BRIEF SUMMARY

The present invention seeks to provide a two-stage carbon dioxide recovery process wherein the overall energy required for carbon dioxide recovery is reduced and/or wherein at least part of the carbon dioxide is recovered at a pressure higher than atmospheric pressure so as to reduce the energy required for compression of the carbon dioxide, e.g., for sequestration, without significantly increasing the energy demand of the process.

The invention provides a process for removing carbon dioxide from a fluid comprising the steps of:
(a) treating the fluid by bringing it into countercurrent contact with a liquid absorbent in a first absorption zone and thereafter in a second absorption zone to absorb at least part of the carbon dioxide contained in the fluid into the absorbent;
(b) depressurizing the loaded absorbent to release a first stream of carbon dioxide and yield a partially regenerated absorbent;
(c) recycling a first stream of the partially regenerated absorbent into the first absorption zone;
(d) heating a second stream of the partially regenerated absorbent to release a second stream of carbon dioxide and yield a regenerated absorbent;
(e) recycling the regenerated absorbent into the second absorption zone;
(f) condensing water vapour entrained in the second stream of carbon dioxide by cooling the second stream of carbon dioxide and transferring at least part of the heat recovered to the partially regenerated absorbent by indirect heat exchange.

The invention further provides a plant for removing carbon dioxide from a fluid comprising
(a) an absorption tower including a first absorption zone and a second absorption zone for bringing the fluid into countercurrent contact with a liquid absorbent;
(b) a depressurizing unit for depressurizing the loaded absorbent to release a first stream of carbon dioxide and yield a partially regenerated absorbent;
(c) a line from the bottom of the depressurizing unit to the first absorption zone for recycling a first stream of the partially regenerated absorbent into the first absorption zone;
(d) a stripping unit for heating a second stream of the partially regenerated absorbent to release a second stream of carbon dioxide and yield a regenerated absorbent;
(e) a line from the bottom of the stripping unit to the second absorption zone for recycling the regenerated absorbent into the second absorption zone; and
(f) indirect heat transfer means for cooling the second stream of carbon dioxide and transferring at least part of the heat recovered onto the partially regenerated absorbent in the bottom of the depressurizing unit.

DETAILED DESCRIPTION OF THE PREFERRED EMBODIMENTS

In preferred embodiments, heating of the second stream of the partially regenerated absorbent takes place at an elevated pressure of at least 3 bar (absolute), preferably 3.5 to 10 bar, and the second stream of carbon dioxide is recovered at the elevated pressure. The second stream of carbon dioxide which is recovered at the elevated pressure may be conveniently introduced into a carbon dioxide pressurizing unit, wherein low pressure stages of compression can be eliminated.

In preferred embodiments, at least the second stream of carbon dioxide which is recovered at the elevated pressure accounts for at least 15%, preferably 20 to 30% (e.g. on a % by volume s.t.p. basis), of the total amount of carbon dioxide removed in the first stream and the second stream of carbon dioxide.

In an embodiment, the stream comprising the carbon dioxide that is liberated during the regeneration step is dumped into an underground zone for the purpose of storage. For example, the stream which is recovered at the elevated pressure may be injected into a hydrocarbon bearing subterranean formation, in particular, an oil-bearing subterranean formation for permanent storage. The liberated gaseous stream will require pressurizing to a pressure that is sufficiently high to permit injection into the underground zone.

Another use of the carbon dioxide relates to the conversion to urea by reaction with ammonia. Also for the use as feed to a urea reactor, the carbon dioxide must be compressed.

Another use of the carbon dioxide relates to the production of food grade $CO_2$, since the $CO_2$ from the second carbon dioxide stream has a very high $CO_2$ impurity, facilitates further downstream purification steps.

An advantage of recovering at least part of the carbon dioxide at a pressure higher than atmospheric pressure is that the overall compression duty is reduced. For example, recovering carbon dioxide at a pressure of 5 bar (absolute pressure) permits at least one stage of compression to be eliminated, while carrying out the regeneration step at a pressure of 9 bar has the potential to eliminate up to 2 stages of compression when compared with liberating the acid gas at atmospheric pressure.

In an embodiment of the invention, the fluid to be treated is selected from carbon dioxide-containing syngas or shifted syngas. For the purposes herein, the term "shifted syngas" is intended to encompass fully or partially shifted syngas. Syngas (synthesis gas) consists primarily of hydrogen, carbon monoxide, and very often some carbon dioxide, and may contain a considerable quantity of nitrogen. There are several ways for producing syngas.

Gasification (or partial oxidation) is the process of converting carbon based products such as coal, biomass, and petrol into carbon monoxide and hydrogen. This is done by causing a chemical reaction between the product and a substoichiometric amount of oxygen in a gasifier to produce syngas. Gasification is a highly efficient method for obtaining energy from organic materials, and can be used as a method for disposing of waste. In an embodiment of the invention, the process comprises gasifying a material selected from carbonaceous materials, hydrocarbonaceous materials, biomass and municipial waste, to form syngas. Fuels for which the gasification process is suited include, but are not limited to: bituminous coal, sub-bituminous coal, brown coal, lignite, clinkering, high-ash coals and biomass. The gasification process can be operated at high pressure to minimize or eliminate the syngas compression needed to reach the desired elevated pressure suitable for downstream processing.

The syngas leaving the gasifier typically passes a syngas cooler and a warm gas cleanup system, including a halide scrubber and a desulfurizer.

The halide scrubber may remove hydrogen chloride and other halides. In some embodiments, the halide scrubber is comprised of a pressure vessel packed with a pebble bed of nahcolite or trona, minerals whose active ingredient is sodium bicarbonate.

The desulfurizer may use, for example, a reactor design typically used in oil refineries. In some embodiments, the transport desulfurizer consists of an absorber loop, in which the sulfur compounds in the syngas are absorbed (e.g., by particles of a zinc-based sorbent), and a regenerator loop, which restores the sorbent. The gases leaving the regenerator contain sulfur dioxide, and are usually sent to an acid plant or Claus unit. The acid plant converts the sulfur dioxide in the regenerator gas into sulfuric acid. A Claus unit produces elemental sulfur.

Alternatively, a low-temperature absorption process may be employed to scrub the gas free of sulphur compounds. These processes typically use a solvent with high capacity for sulphur-containing species such as $H_2S$ and $SO_2$. The removal of sulphur-containing species may depend primarily on physical absorption such as Rectisol®, Selexol® or PuraTreat®A processes, or chemical absorption such as MDEA, sMDEA® or Flexsorb® SE processes. Sulfur recovery from the stripped gas can also be included.

Fly ash and spalled sorbent may be removed from the syngas by metallic candle filters.

Steamreforming a hydrocarbonaceous material is another important way to form syngas. Steam reforming is the catalytic reaction of a hydrocarbonaceous material, such as natural gas, with steam to produce a syngas, which includes $H_2$, $CO_2$, CO, $CH_4$, and $H_2O$ with an $H_2$ to CO ratio of about 3:1 or higher. The steam reformation reaction is endothermic. Therefore, external heat is required. The natural gas and steam are typically fed into alloy tubes that contain a nickel based catalyst for the reforming reaction. The catalyst tubes are placed inside a refractory lined structure. A portion of the natural gas is used as fuel to provide the heat required for the reaction.

Optionally, the syngas is passed through a water-gas shift reactor to obtain a shifted syngas. The water-gas shift reaction (WGS) is a chemical reaction in which carbon monoxide reacts with water to form carbon dioxide and hydrogen.

In an embodiment, the process according to the invention comprises firing a gas turbine by the syngas or shifted syngas after removing carbon dioxide therefrom. If the syngas is to be put to use to generate electricity, then it is generally used as a fuel in an IGCC (integrated gasification combine cycle) power generation configuration. First converting the syngas to a shifted syngas allows separation of the $CO_2$ from the hydrogen/nitrogen mixture. The $CO_2$ may be dried, pressurized, and sequestered, such as in geological storage. The pre-combustion carbon capture system of the present invention removes the $CO_2$ more cheaply than systems which remove $CO_2$ from flue gases. This may, for example, be due to high pressure and concentration in the scrubber.

Gas turbines originally developed to serve as natural gas combined cycle powerplants (NGCCs) may be used for IGCCs. In some embodiments, the gas turbines used with syngas in connection with the present invention can be operated without modification. In other embodiments, gas turbines are modified. For example, gas turbines can be modified by opening up the flow passages through the inlet vanes of the expander to accommodate the higher volumetric flow rate of syngas. This may increase the stall margin and reduce the danger of flameout. Gas turbines operating with syngas may have a higher flow rate and power output than turbines operating on natural gas. Burning of hydrogen in a gas turbine presents significant technical and engineering challenges because of the high reactivity of hydrogen, its fast turbulent flame speed, and the propensity of the $H_2$/air mixture to auto-ignite. Typically, the fuel/air mixture may require diluting the with inert gases.

In some embodiments using syngas, the combustor, which is normally of a pre-mix design with natural gas (to minimize NOx emissions), must be nozzle-mix (or, diffusion design) with syngas to avoid flashback due to the hydrogen in the syngas. In some embodiments, even diffusion burners can meet the NOx standards being established for IGCCs (15 ppmv).

In some embodiments, the shifted syngas is used for ammonia synthesis.

In other embodiments, the fluid to be treated is a hydrocarbonaceous fluid, in particular natural gas or liquefied natural gas (LNG). The process according to the invention may also be suitable to treat off gases from refinery plants such as the crude distillation unit CDU or conversion plants, which may involve catalytic processes (such as fluidised catalytic cracking units FCCU and hydro cracking units HCU) and thermal processes (such as visbreaker units VDU and coker units DCU).

In the process of the invention, the fluid is treated by bringing it into countercurrent contact with a liquid absorbent in a first absorption zone and thereafter in a second absorption zone to absorb at least part of the carbon dioxide contained in the fluid into the absorbent. The liquid absorbent is capable of absorbing carbon dioxide and being regenerated by expansion to a lower pressure, heating and/or stripping by an inert fluid. Besides carbon dioxide the fluids which are treated in accordance with the present invention may contain other acid compounds such as, for example, $H_2S$, $SO_2$, $CS_2$, HCN, COS or mercaptans. These acid compounds may be fully or partially removed along the carbon dioxide.

Preferably, the absorbent comprises an aqueous amine solution. Preferred are aqueous solutions of amines having a total amine content of 30 to 70% by weight, in particular 40 to 60% by weight.

Preferably, the absorption medium comprises an aqueous solution of monoethanolamine (MEA), methylaminopropylamine (MAPA), piperazine, diethanolamine (DEA), triethanolamine (TEA), diethylethanolamine (DEEA), diisopropylamine (DTPA), aminoethoxyethanol (AEE), dimethylaminopropanol (DIMAP) and methyldiethanolamine (MDEA), methyldiisopropanolamine (MDIPA), 2-amino-1-butanol (2-AB) or mixtures thereof.

Preferred absorption media comprise at least one alkanolamine having 4 to 12 carbon atoms. Particularly preferred absorption media comprise at least one tertiary alkanolamine and preferably an activator in the form of a primary or secondary amine. Preferred activators are saturated, 5- to 7-member heterocyclic compounds having at least one NH group and if appropriate a further heteteroatom in the ring selected from an oxygen atom and a nitrogen atom. Suitable activators are piperazine, 1-methylpiperazine, 2-methylpiperazine, 1-aminoethylpiperazine, morpholine, piperidine. Other preferred activators are selected from methylaminopropylamine, 2-amino-1-butanol and aminoethoxyethanol.

The absorbent described in U.S. Pat. No. 4,336,233 is also very particularly proven. It is an aqueous solution of methyldiethanolamine (MDEA) and piperazine as absorption accelerator or activator (aMDEA®, BASF AG, Ludwigshafen). The absorbent described there comprises 1.5 to 4.5 mol/l of methyldiethanolamine (MDEA) and 0.05 to 0.8 mol/l, preferably up to 0.4 mol/l of piperazine.

A further preferred absorbent is an aqueous solution of dimethylaminopropanol (DIMAP) and piperazine. The absorbent preferably comprises 2 to 5.5 mol/l of dimethylaminopropanol (DIMAP) and 0.03 to 0.8 mol/l of piperazine.

In the absorption step the carbon dioxide-containing gaseous feed stream is brought into gas-liquid contact with the liquid absorbent. To this end any suitable absorber may be employed. The absorber may contain contacting means such as trays, packed beds or other contact devices which provide intimate contact between the gaseous stream and the absorbent. The gaseous stream may be introduced into the lower section of the absorber and pass to the top of the absorber. The absorbent may be introduced into the upper portion of the absorber and pass to the bottom of the absorber counter-currently to the gaseous stream.

In the absorption step, the temperature of the absorbent should not exceed 100° C., since at higher temperatures the attainable carbon dioxide loading is less and, generally, high temperatures cause undesirable corrosion. The absorption step is, as a rule, carried out at an absorber top temperature of from 40° to 60° C., though the temperature may be as high as 75° C. The absorption step can also be carried out at lower temperatures, e.g. from 25° C. upward; however, such low temperatures result in an increased consumption of energy. The bottom temperature of the absorber should not be higher than 100° C.

Optionally, the loaded absorbent may be expanded or flashed from the high pressure prevailing in the absorber to an intermediate pressure at which inert gases are released, such as absorbed components of the feed stream, e.g., trace hydrocarbons, nitrogen, carbon monoxide, and other inert gases. This intermediate pressure flash is preferably operated in such a way that no significant amounts of carbon dioxide are released. Typically, a pressure of from 15 to 3 bar (absolute pressure) is used in this stage.

The loaded absorbent is then (further) expanded or flashed (depressurized) to release a first stream of carbon dioxide (and other acidic gases, if present in the feed stream) and yield a partially regenerated absorbent. Typically, a pressure of from 4 bar to 200 mbar, preferably 3 to 1 bar (absolute pressure) is used in this stage. The pressure expansion can be carried out, for example, using a throttle valve, expanding the loaded absorbent into a flash tank. Additionally, or alternatively, the absorbing fluid can be passed through an expansion turbine which can drive a generator and produce electrical energy. The carbon dioxide which is withdrawn from the flash tank entrains water vapour and amine absorbent. Preferably, it is passed through a condenser wherein it is partially condensed. The resulting two phase stream may be separated into carbon dioxide gas and into condensate. The condensate, which comprises primarily water and amine, is returned to the flash tank.

A first stream of the partially regenerated absorbent is recycled into the first absorption zone. The partially regenerated absorbent entering the first absorption zone preferably has a temperature of 50 to 90° C., in particular 60 to 80° C.

A second stream of the partially regenerated absorbent is heated to release a second stream of carbon dioxide (and other acidic gases, if present in the feed stream) and yield a regenerated absorbent. This regeneration step requires heating of the carbon dioxide-rich absorbent, typically to a temperature above 130° C., preferably above 150° C., by direct or indirect heating. Preferably, the regeneration step comprises stripping the absorbing liquid with an inert fluid. For this purpose the absorbent and a stripping medium (a hot inert gas, nitrogen or steam being preferred) are passed in countercurrent fashion through a desorption column provided with loose packings, arranged packings or trays. To provide the necessary heating, the bottom of the column is provided with a suitable reboiler. Preferably, the stripping medium is steam which forms by partial evaporation of the absorbent in the bottom of the column.

Before being fed into the absorber, the regenerated absorbent is usually passed through a heat exchanger and brought to the temperature required for the absorption step. Part of the heat removed from the regenerated absorbent leaving the stripping column may be used to pre-heat the second stream of partially regenerated absorbent leaving the flash tank. Thus, in preferred embodiments, the second stream of the partially regenerated absorbent is pre-heated by indirect heat exchange with the regenerated absorbent.

The regenerated absorbent is then recycled into the second absorption zone. The regenerated absorption medium entering the second absorption zone, preferably has a temperature of 25 to 75° C., in particular 40 to 60° C. To set these temperatures, the regenerated absorbent is typically passed through a cooler.

The second stream of carbon dioxide which is discharged from the stripping unit is saturated with water vapour. The carbon dioxide must be dried before it may be further processed, e.g., compressed. It is an essential feature of the invention that water vapour entrained in the second stream of carbon dioxide is condensed by cooling the second stream of carbon dioxide (without intermixing the second stream of carbon dioxide with other process streams, in particular without mixing the second stream of carbon dioxide with the first stream of carbon dioxide released in the depressurizing stage) and transferring at least part of the heat recovered to the partially regenerated absorbent by indirect heat exchange. "Indirect heat exchange" means the bringing of two fluids into heat exchange relation without any physical contact or intermixing of the fluids with each other.

Conveniently, the second stream of carbon dioxide is cooled with a condenser or a series of condensers. The separated water may be returned into the stripping unit. The heat recovered at the condenser may be transferred to the partially regenerated absorbent in the bottom of the depressurizing unit (flash tank), by withdrawing partially regenerated absorbent from the depressurizing unit, circulating it through the condenser and returning the heated partially regenerated absorbent to the depressurizing unit, optionally with flashing. Alternatively, a coolant may be forcibly circulated through a coolant circuit which comprises a heat exchanger for cooling the second stream of carbon dioxide and a further heat exchanger which is in heat exchange relation with the partially regenerated absorbent.

Particularly in embodiments wherein the second stream of carbon dioxide is recovered at an elevated pressure, cooling of the second stream of carbon dioxide may cause aerosol formation. Aerosols are fogs that arise from very small droplets. Condensation aerosols arise when a gas mixture is cooled below the dew point. Removal of the aerosol droplets may present a difficult problem. It has been found that aerosol formation is virtually prevented when the cooling of the second stream of carbon dioxide occurs in at least two successive stages to stepwise reduce the temperature of the stream. Thus, the second stream of carbon dioxide may be passed through a first condenser and at least one successive condenser. In the first condenser, the second stream of carbon dioxide is suitably cooled to a temperature in the range of from 100 to 65° C., and in a second condenser the stream is cooled to a temperature below 60° C. The heat recovered in at least one of the condensers, preferably the first condenser, is transferred to the partially regenerated absorbent.

The invention will now be described in more detail on the basis of the accompanying figures and the examples hereinafter.

Figure 1:
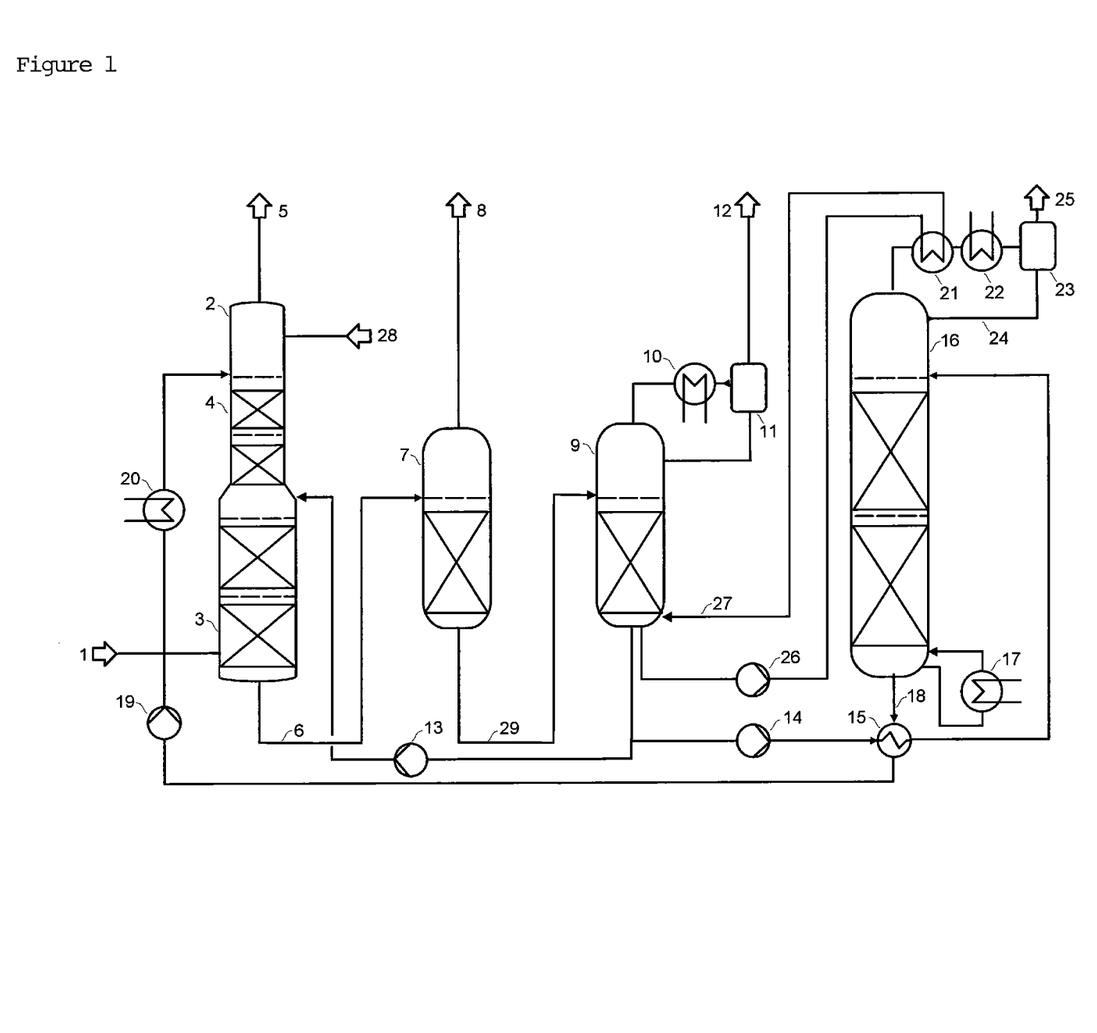
FIG. 1 is a diagram which depicts an exemplary plant in accordance with the present invention.

FIG. 1 is a diagram which depicts an exemplary plant in accordance with the present invention.

Figure 2:
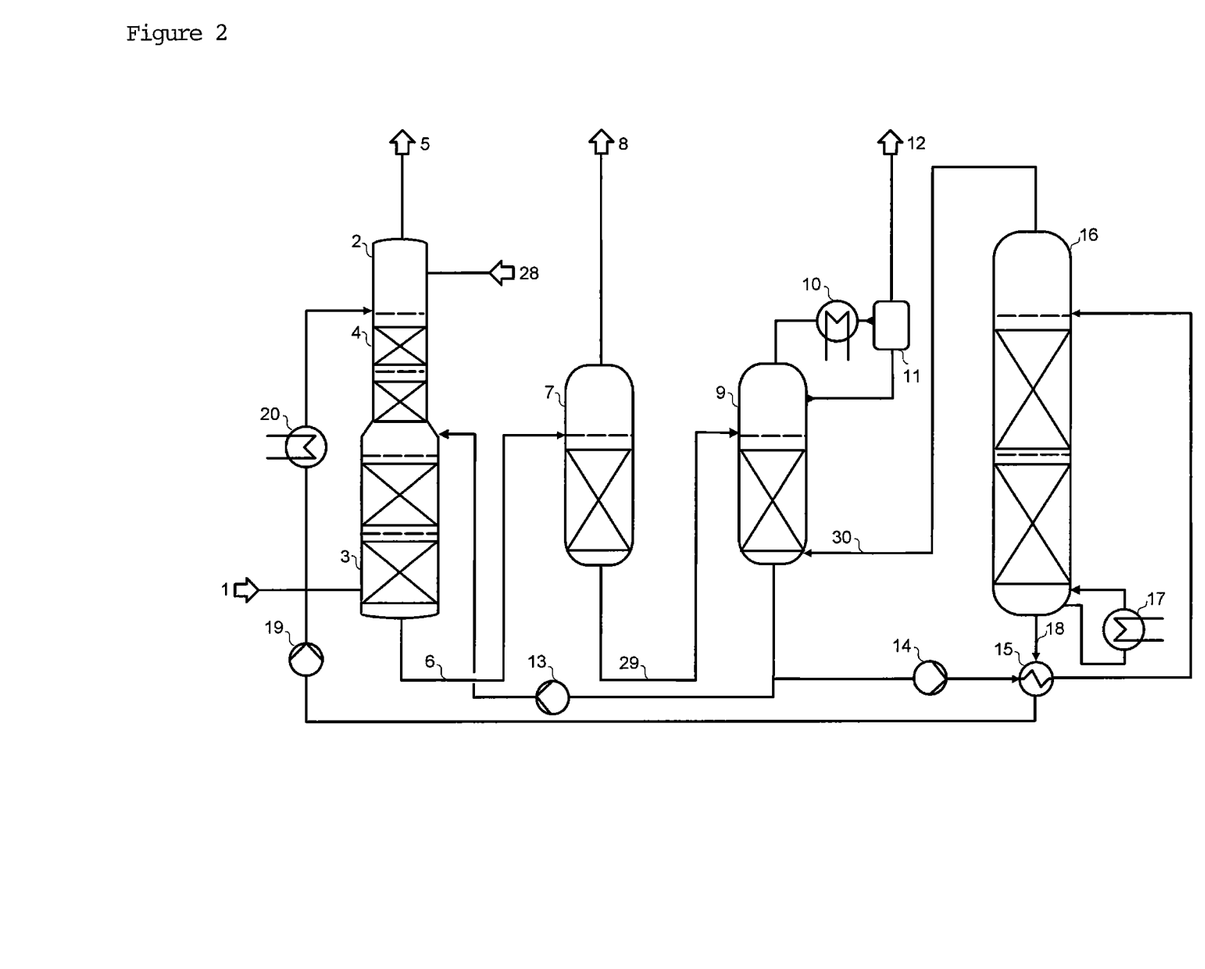
FIG. 2 is a diagram of a comparative plant setup.

FIG. 2 is a diagram of a comparative plant setup.

With regard to FIG. 1, a feed gas 1 is supplied to a first carbon dioxide absorption zone 3 installed in the lower part of a carbon dioxide removal tower 2. The gas moves upwardly through the first carbon dioxide absorption zone 3 and subsequently in a second carbon dioxide absorption zone 4. Absorption zones 3 and 4 contain column internals or mass transfer elements such as trays or random or structured packing. An amine absorbing liquid is supplied via cooler 20 from the top of the carbon dioxide removal tower 2. The feed gas and the amine absorbing liquid are brought into contacted with to each other and the amine absorbing liquid absorbs carbon dioxide contained in the feed gas. A treated gas 5 is discharged from the carbon dioxide removal tower 2.

On the other hand, the amine absorbing liquid, which has absorbed carbon dioxide, is conducted via line 6 to flash tank 7 and depressurized to an intermediate pressure. Depressurization will cause trace hydrocarbons, nitrogen, carbon monoxide, and other inert gases to be released from the amine absorbing liquid. These gases are withdrawn via line 8.

The resulting inert gas-depleted carbon dioxide loaded amine absorbing liquid is withdrawn from flash tank 7 is passed via line 29 to flash tank 9 and depressurized to a low pressure. The bulk of the absorbed carbon dioxide is released from the amine absorbing liquid. The carbon dioxide top vapour is withdrawn from the upper portion of flash tank 9 and passed through reflux condenser 10 wherein it is partially condensed. The resulting two phase stream is passed to phase separator 11 wherein it is separated into carbon dioxide gas and into condensate. The carbon dioxide is removed from phase separator 11 in stream 12. The condensate, which comprises primarily water and amine, is withdrawn from phase separator and returned to flash tank 9.

A first stream of partially regenerated amine absorbing liquid is withdrawn from the bottom of flash tank 9 and recycled via pump 13 to carbon dioxide removal tower 2. The partially regenerated amine absorbing liquid enters the carbon dioxide removal tower 2 above the first absorption zone 3. A second stream of partially regenerated amine absorbing liquid is passed through pump 14, heated by regenerated absorbing liquid 18 at a heat exchanger 15 and supplied to the regeneration tower 16. Regeneration tower 16 is held at an elevated temperature by reboiler 17, to release carbon dioxide and the partially regenerated amine absorbing solution to be fully regenerated. The regenerated absorbing liquid 18 is cooled by the heat exchanger 15 and is recycled to the top of the carbon dioxide absorption tower 2 via pump 19 and cooler 20. The regenerated amine absorbing liquid enters the carbon dioxide removal tower 2 above the second absorption zone 4.

Carbon dioxide which is discharged from the top of the regeneration tower 16 and which is saturated with water is cooled with a series of condensers 21 and 22 and the water contained therein is discharged by a separator 23. The separated water 24 is refluxed into the regeneration tower 16. In a preferred embodiment, regeneration tower 16 is operated at an elevated pressure of at least 3 bar and the carbon dioxide recovered in stream 25 may be introduced in a carbon dioxide pressurizing unit (not shown).

The heat recovered at condenser 21 is transferred to the partially regenerated amine absorbing liquid in the bottom of flash tank 9, by withdrawing partially regenerated amine absorbing liquid from flash tank 9 through pump 26, circulating it through condenser 21 and returning the heated partially regenerated amine absorbing liquid to flash tank 9 via line 27.

Make-up water is added to the carbon dioxide removal tower 2 via line 28, to compensate for water losses via the gaseous streams leaving the treatment plant.

With regard to FIG. 2, like reference signs have been used for like components as in FIG. 1.

Carbon dioxide which is discharged from the top of the regeneration tower 16 and which is saturated with water is passed via line 30 into the lower part of flash tank 9. Water vapour contained in the carbon dioxide stream is condensed and washed out from the stream by direct heat-exchange with the partially regenerated amine absorbing liquid.

This plant setup essentially corresponds to a conventional setup where a flash section is installed in the upper part of a regeneration tower.

EXAMPLES

A synthesis gas stream of 29700 m$^3$ (s.t.p.)/h having a $CO_2$ content of 18% is to be depleted to a residual $CO_2$ content of 0.5% by volume. Further components in the gas are essentially hydrogen, nitrogen, argon, carbon monoxide and methane. An absorbing liquid comprised of water (60 wt %), methyldiethanol amine (37 wt. %) and piperazine (3 wt. %) was used.

In the table 1 hereinafter, the operating data of a plant according to FIG. 1 (according to the invention) are shown. The data were obtained using a custom designed amine treater simulation software. It is anticipated that comparable results are obtained using commercial process simulation software such as ProMax® or ProTreat® simulation softwares. The designation of the gas streams corresponds to the reference signs in figure:

In the table 2 hereinafter, the operating data of a comparative plant according to FIG. 2 are shown.

TABLE 1

Operating data of a plant according to the invention

| | Gas Streams | | | | | | | | | |
|---|---|---|---|---|---|---|---|---|---|---|
| | 1 | | 5 | | 8 | | 12 | | 25 | |
| Component | % by vol. (dry) | m$^3$(s.t.p.)/h | % by vol. (dry) | m$^3$(s.t.p.)/h | % by vol. (dry) | m$^3$(s.t.p.)/h | % by vol. (dry) | m$^3$(s.t.p.)/h | % by vol. (dry) | m$^3$(s.t.p.)/h |
| $CO_2$ | 18.00 | 29700.00 | 0.05 | 67.47 | 64.88 | 704.81 | 99.83 | 21904.70 | 100.00 | 7020.41 |
| CO | 0.50 | 825.00 | 0.61 | 822.19 | 0.23 | 2.54 | 0.00 | 0.26 | 0.00 | 0 |
| $H_2$ | 61.00 | 100650.00 | 74.32 | 100295.00 | 29.51 | 320.58 | 0.16 | 34.47 | 0.00 | 0 |
| $N_2$ | 20.00 | 33000.00 | 24.41 | 32940.00 | 5.23 | 56.80 | 0.01 | 3.17 | 0.00 | 0 |
| $CH_4$ | 0.25 | 412.50 | 0.30 | 410.67 | 0.15 | 1.62 | 0.00 | 0.22 | 0.00 | 0 |
| Ar | 0.25 | 412.50 | 0.31 | 412.45 | 0.00 | 0.05 | 0.00 | 0.00 | 0.00 | 0 |
| Dry Gas Amount [m$^3$(s.t.p.)/h] | 165000 | | 134948 | | 1086 | | 21943 | | 7020 | |

TABLE 1-continued

Operating data of a plant according to the invention

| | | | | | |
|---|---|---|---|---|---|
| Total vol. flow [m³(s.t.p.)/h] | 167171 | 135601 | 1177 | 24459 | 7198 |
| Temperature [° C.] | 75.0 | 50.0 | 83.0 | 50.0 | 50.0 |
| Pressure [bar abs.] | 29.7 | 29.5 | 6.4 | 1.2 | 5.0 |

| | Liquid streams | | | |
|---|---|---|---|---|
| | Liquid mass flow [t/h] | | 28 | |
| | Liquid vol. flow [m³/h] | | 1.02 | |
| | Temperature [° C.] | | 1.03 | |
| | | | 50.0 | |

| Heat exchangers | 0 | 10 | 22 | 15 | 17 | 21 |
|---|---|---|---|---|---|---|
| Heat duty [MW] | −9.5 | −2.7 | 0.5 | 20.9 | 12.0 | −3.1 |

TABLE 2

Operating data of a comparative plant

| | Gas Streams | | | | | | | |
|---|---|---|---|---|---|---|---|---|
| | 1 | | 5 | | 8 | | 12 | |
| Component | % by vol. (dry) | m³(s.t.p.)/h | % by vol. (dry) | m³(s.t.p.)/h | % by vol. (dry) | m³(s.t.p.)/h | % by vol. (dry) | m³(s.t.p.)/h |
| $CO_2$ | 18.00 | 29700.00 | 0.05 | 67.47 | 64.76 | 690.18 | 99.87 | 28940.50 |
| CO | 0.50 | 825.00 | 0.61 | 822.19 | 0.24 | 2.52 | 0.00 | 0.26 |
| $H_2$ | 61.00 | 100650.00 | 74.32 | 100295.00 | 29.63 | 315.80 | 0.12 | 34.22 |
| $N_2$ | 20.00 | 33000.00 | 24.41 | 32940.00 | 5.22 | 55.66 | 0.01 | 3.11 |
| $CH_4$ | 0.25 | 412.50 | 0.30 | 410.67 | 0.15 | 1.60 | 0.00 | 0.22 |
| Ar | 0.25 | 412.50 | 0.31 | 412.45 | 0.00 | 0.05 | 0.00 | 0.00 |
| Dry Gas Amount [m³(s.t.p.)/h] | 165000 | | 134954 | | 1066 | | 28978 | |
| Total vol. flow [m³(s.t.p.)/h] | 167171 | | 135608 | | 1152 | | 32301 | |
| Temperature [° C.] | 75.0 | | 50.0 | | 82.1 | | 50.0 | |
| Pressure [bar abs.] | 29.7 | | 29.5 | | 6.4 | | 1.2 | |

| | Liquid streams | | | |
|---|---|---|---|---|
| | Liquid mass flow [t/h] | | 28 | |
| | Liquid vol. flow [m³/h] | | 1.52 | |
| | Temperature [° C.] | | 1.54 | |
| | | | 50.0 | |

| Heat exchangers | 20 | 10 | 15 | 17 |
|---|---|---|---|---|
| Heat duty [MW] | −9.2 | −3.4 | 8.7 | 12.1 | s.t.p. = standard temperature and pressure (0° C. and 1 atm)

These results show that the heat duty of reboiler 17 is essentially the same in the inventive example and the comparative example. However, in the inventive example a considerable portion of the carbon dioxide is recovered at a pressure of 5 bar, which reduces compression costs when the carbon dioxide is, e.g., to be sequestered or used for urea synthesis.

We claim:

1. A process for removing carbon dioxide from a fluid comprising the steps of:
   (a) treating the fluid by bringing it into countercurrent contact with a liquid absorbent in a first absorption zone and thereafter in a second absorption zone to absorb at least part of the carbon dioxide contained in the fluid into the absorbent;
   (b) depressurizing the loaded absorbent to release a first stream of carbon dioxide and yield a partially regenerated absorbent;
   (c) recycling a first stream of the partially regenerated absorbent into the first absorption zone;
   (d) heating a second stream of the partially regenerated absorbent to release a second stream of carbon dioxide and yield a regenerated absorbent;
   (e) recycling the regenerated absorbent into the second absorption zone;
   (f) condensing water vapour entrained in the second stream of carbon dioxide by cooling the second stream of carbon dioxide and transferring at least part of the heat recovered to the partially regenerated absorbent by indirect heat exchange, wherein the cooling of the second stream of carbon dioxide occurs in at least two successive stages.

2. The process of claim 1, wherein heating of the second stream of the partially regenerated absorbent takes place at an elevated pressure of at least 3 bar (absolute) and the second stream of carbon dioxide is recovered at the elevated pressure.

3. The process of claim 2, wherein the second stream of carbon dioxide is introduced into a carbon dioxide pressurizing unit.

4. The process of claim 1, wherein the fluid is selected from syngas and shifted syngas.

5. The process of claim 4, comprising gasifying a material selected from carbonaceous materials, hydrocarbonaceous materials, biomass and municipial waste, to form syngas and, optionally, passing the syngas through a water-gas shift reactor to obtain a shifted syngas.

6. The process of claim 4, comprising steamreforming a hydrocarbonaceous material to form syngas.

7. The process of claim 4, comprising firing a gas turbine by the syngas or shifted syngas after removing carbon dioxide therefrom.

8. The process of claim 4, comprising subjecting the syngas or shifted syngas, after removing carbon dioxide therefrom, to catalytic reaction for synthesis of ammonia.

9. The process of claim 1, wherein the fluid is a hydrocarbonaceous fluid.

10. The process of claim 1, wherein the second stream of the partially regenerated absorbent is pre-heated by indirect heat exchange with the regenerated absorbent.

11. The process of claim 1, wherein the absorbent comprises an aqueous amine solution.

12. The process of claim 11, wherein the aqueous amine solution comprises at least one tertiary alkanol amine and at least one activator.

13. The process of claim 12, wherein the aqueous amine solution comprises piperazine and at least one of methyldiethanol amine and dimethylaminopropanol.

14. A plant for removing carbon dioxide from a fluid comprising
 (a) an absorption tower including a first absorption zone and a second absorption zone for bringing the fluid into countercurrent contact with a liquid absorbent;
 (b) a depressurizing unit for depressurizing the loaded absorbent to release a first stream of carbon dioxide and yield a partially regenerated absorbent;
 (c) a line from the bottom of the depressurizing unit to the first absorption zone for recycling a first stream of the partially regenerated absorbent into the first absorption zone;
 (d) a stripping unit for heating a second stream of the partially regenerated absorbent to release a second stream of carbon dioxide and yield a regenerated absorbent;
 (e) a line from the bottom of the stripping unit to the second absorption zone for recycling the regenerated absorbent into the second absorption zone; and
 (f) indirect heat transfer means for cooling the second stream of carbon dioxide and transferring at least part of the heat recovered onto the partially regenerated absorbent in the bottom of the depressurizing unit, wherein the cooling of the second stream of carbon dioxide occurs in at least two successive stages.

15. The plant of claim 14, comprising a carbonizer/gasifier that forms syngas and a water-gas shift reactor.

16. The plant of claim 14, comprising a gas turbine fired by shifted syngas.

* * * * *